(12) United States Patent
Tamaru

(10) Patent No.: US 6,639,621 B2
(45) Date of Patent: Oct. 28, 2003

(54) SCANNER UNIT HAVING AN OPTICAL ELEMENT SUPPORTING PLATE

(75) Inventor: Yasuo Tamaru, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 45 days.

(21) Appl. No.: 09/987,119

(22) Filed: Nov. 13, 2001

(65) Prior Publication Data

US 2002/0057467 A1 May 16, 2002

(30) Foreign Application Priority Data

Nov. 13, 2000 (JP) ........................................ 2000-345515

(51) Int. Cl.[7] .......................... B41J 2/385; G03G 13/04
(52) U.S. Cl. ...................................... 347/257; 347/138
(58) Field of Search ................................. 347/257, 256, 347/263, 242, 241, 134, 138, 152

(56) References Cited

U.S. PATENT DOCUMENTS 5,499,045 A * 3/1996 Takeshita et al. ........... 347/257
5,506,612 A * 4/1996 Ogata et al. ................. 347/138
5,764,269 A * 6/1998 Takeshita et al. ............ 347/242
5,803,622 A * 9/1998 Mama et al. ................. 347/257

FOREIGN PATENT DOCUMENTS

JP        U 2-21616         2/1990

* cited by examiner

Primary Examiner—Susan S.Y. Lee
(74) Attorney, Agent, or Firm—Oliff & Berridge, PLC

(57) ABSTRACT

A scanner unit having an optical element supported by a supporting plate. The supporting plate includes a first engagement portion, first spring portions, a second spring portion and a second engagement portion. The first engagement portion engages protrusions of supporting pins that support a reflective surface of a beam detection mirror in a predetermined position. The first spring portions urge the beam detection mirror toward the supporting pins. The second spring portion urges an upper surface of the beam detection mirror and holds the mirror between a bottom plate and the second spring portion. The second engagement portion engages a flange to prevent the supporting plate from coming off upward against an urging force from the second spring portion.

20 Claims, 8 Drawing Sheets

SCANNER UNIT HAVING AN OPTICAL ELEMENT SUPPORTING PLATE

BACKGROUND OF THE INVENTION

1. Field of Invention

The invention relates to an optical element supporting plate for a scanner unit that scans and irradiates light generated by a light source, more particularly, to an optical element supporting plate that fixes an optical element, that provides an optical path of the light, in a housing of the scanner unit.

2. Description of Related Art

A conventional scanner unit includes various optical elements in its housing, such as lenses, mirrors, slit plates and a polygon mirror, which deflect light generated by a light source, such as a laser emitting portion, in a predetermined scanning direction. These optical elements are fixed to the housing, using an adhesive, screws, or other fixative means, to support one end face of the optical elements at a bottom portion of the housing while the other end face of the optical elements are urged toward the screws using springs.

However, when the optical elements are fixed to the housing using an adhesive, the location and/or angle of the optical elements might change if the scanner unit is subjected to shocks and/or vibrations before the adhesive sets. Therefore, it is undesirable to use an adhesive at portions requiring mounting accuracy. When the optical elements are fixed to the housing using screws and springs, the screws must have sufficient strength so as to securely support the optical element in a proper position against the urging force from the springs.

SUMMARY OF THE INVENTION

The invention provides an optical element supporting plate for a relatively small-sized scanner unit, which can stably secure an optical element in a proper position.

According to one aspect of the invention, a supporting plate for an optical element used in a scanner unit that scans and irradiates light includes an engagement portion to be attached to a supporting member projected from a housing of the scanner unit, and a spring portion bent from the engagement portion toward the supporting member. The spring portion exerts an urging force toward the supporting member on an optical element disposed between the supporting member and the spring portion.

According to the invention, the engagement portion of the supporting plate engages the supporting member. The one end face of the optical element is supported by the supporting member, and the other end face of the optical element is urged toward the engagement portion by a spring portion of the supporting plate. Consequently, the optical element can be secured in the proper position with stability.

BRIEF DESCRIPTION OF THE DRAWINGS

Embodiments of the invention will be described in detail with reference to the following figures wherein.

DETAILED DESCRIPTION OF THE PREFERRED EMBODIMENTS

Embodiments of the invention will be described with reference to the accompanying drawings.

A first embodiment of the invention will be described with reference to FIGS. 1 to 6C.

Figure 1:
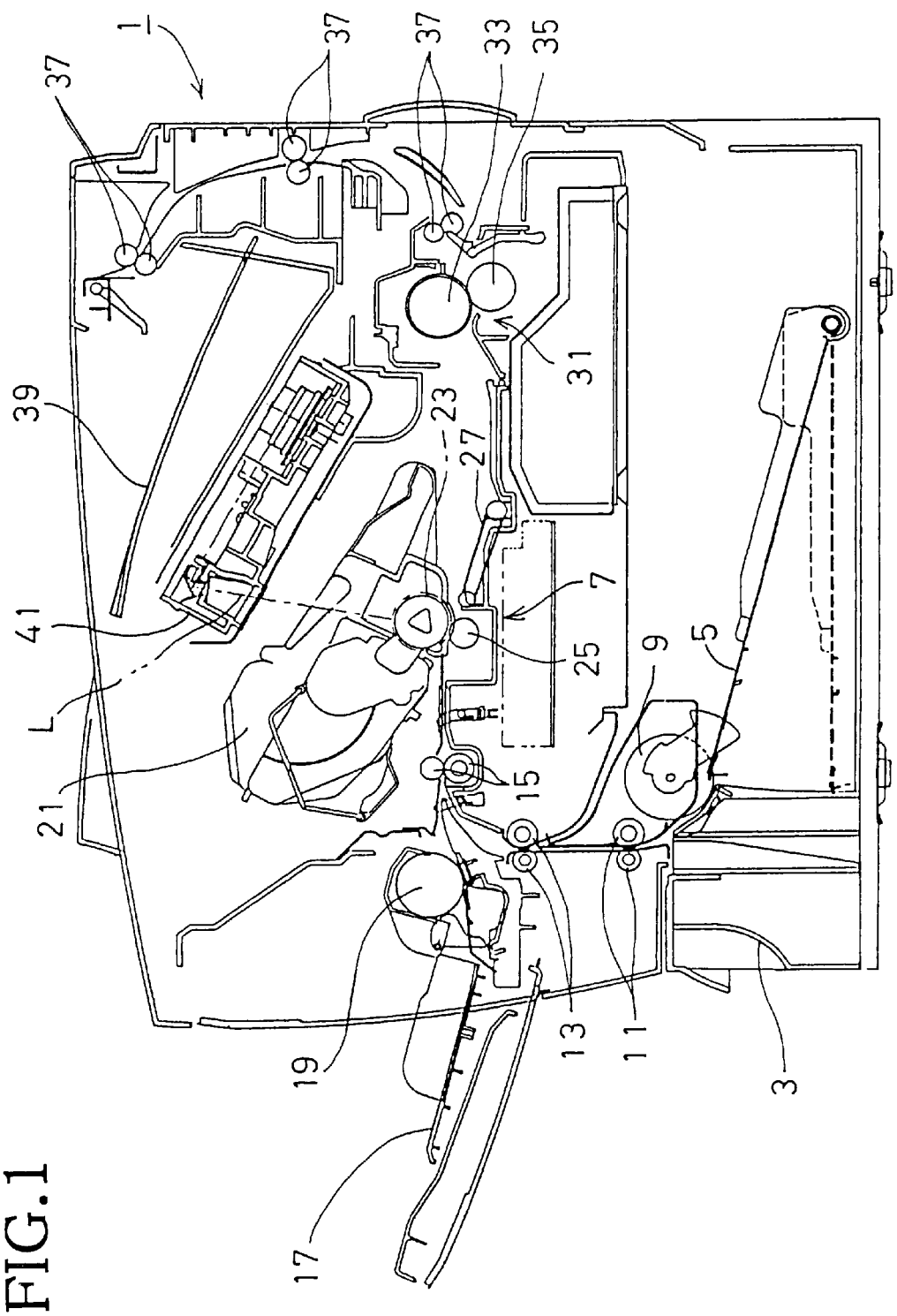
FIG. 1 is a vertical sectional view of a laser-beam printer to which a supporting plate of the invention is applied.

As shown in FIG. 1, a laser-beam printer 1 has a sheet feed tray 3 detachably attached to a lower portion of the laser-beam printer 1. The sheet feed tray 3 includes a sheet supporting plate 5, which is upwardly urged by a spring (not shown). A sheet feed roller 9 is disposed above a free end side of the sheet supporting plate 5. The sheet feed roller 9 feeds recording sheets, one by one, from recording sheets (not shown) stacked on the sheet supporting plate 5, toward an image forming unit 7. Between the sheet feed roller 7 and the image forming unit 9, two pairs of conveying rollers 11, 13 for conveying the recording sheet and a resist roller 15 are disposed, in this order, from below. The resist roller 15 temporarily stops the sheet to adjust any deviation of the sheet. Recording sheets stacked on a manual sheet feed tray 17 can be also conveyed to the resist roller 15 by a sheet feed roller 19.

The laser-beam printer 1 of this embodiment can be attached with a tray unit (not shown), including a sheet feed tray that has the same structure as the sheet feed tray 3, to its bottom. A plurality of the tray units can be stacked one upon the other under the laser-beam printer 1.

The image forming unit 7 includes a photoconductive drum 23, which is provided in a process cartridge 21, and a transfer roller 25, which is disposed to be opposed to the photoconductive drum 23. While the sheet is being passed between the photoconductive drum 23 and the transfer roller 25, a toner image is formed on the sheet by toner. Then, the sheet is conveyed to a fixing unit 31 via a conveying belt 27. In the fixing unit 31, the sheet having the toner image is sandwiched between a heat roller 33 and a pressing roller 35, so that the toner image on the sheet is fixed by heat. After that, the sheet having the fixed image is conveyed by three pairs of conveying rollers 37 to be discharged onto an output tray 39 provided at the top of the laser-beam printer 1. Provided between the output tray 39 and the process cartridge 21, is a scanner unit 41, which exposes the photoconductive drum 23 by laser light L.

Figure 2:
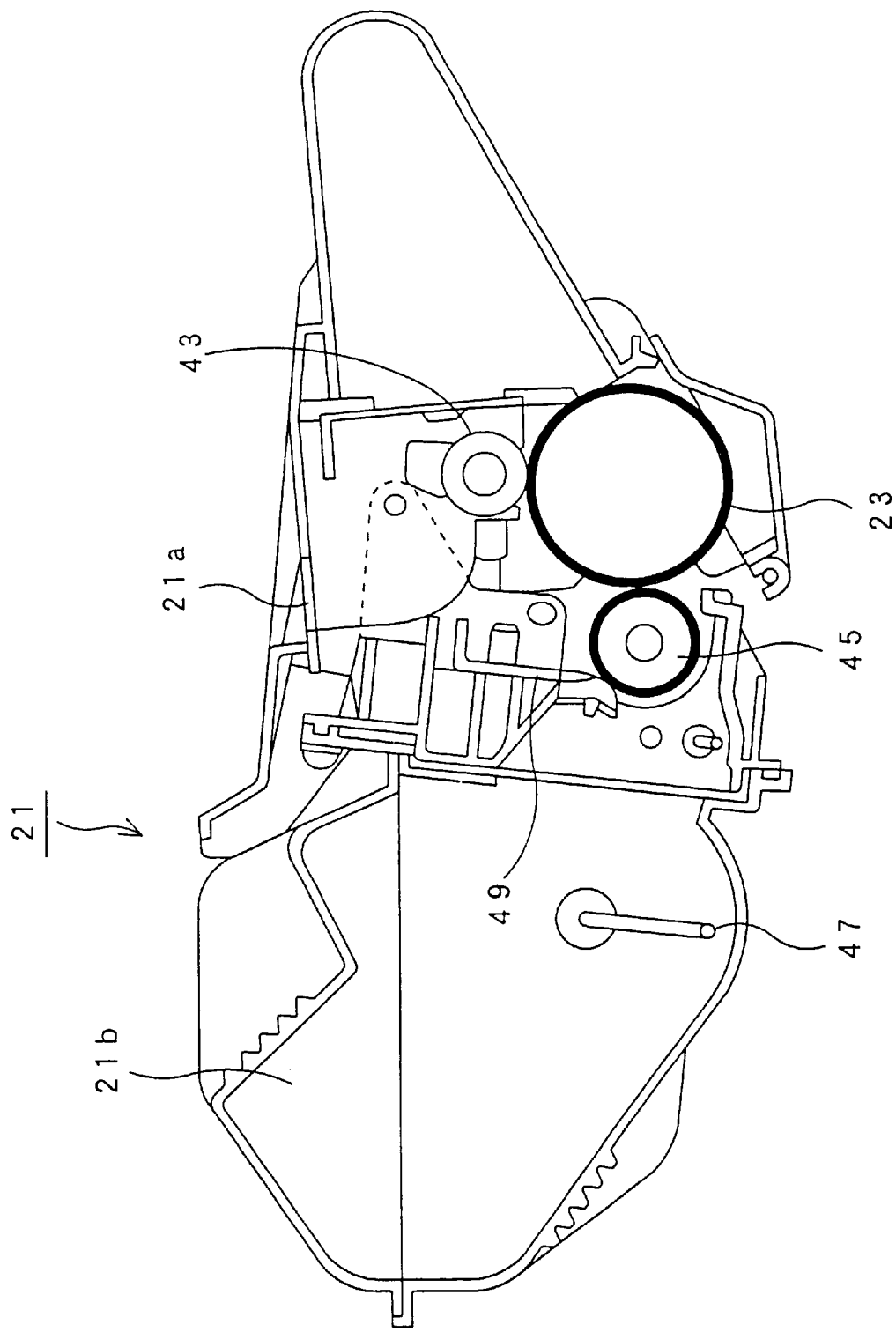
FIG. 2 is a vertical sectional view of a process cartridge of the laser-beam printer.

As shown in FIG. 2, the process cartridge 21 includes the rotatable photoconductive drum 23, having a photoconductive layer around its surface, and a charging roller 43, which charges the surface of the photoconductive drum 23 to a uniform electric potential. An electrostatic latent image is formed on the surface of the photoconductive drum 23, charged by the charging roller 43, by the laser light L (see FIG. 1) emitted from the scanner unit 41 via an opening 21a.

Then, a developing roller 45 supplies toner onto the surface of the photoconductive drum 23 and, thus, the electrostatic latent image is developed. The toner adhered to the surface of the photoconductive drum 23, as described above, is transferred onto the recording sheet passing between the photoconductive drum 23 and the transfer roller 25.

The charging roller 43 and the developing roller 45 rotate, following the photoconductive drum 23. The process cartridge 21 includes an agitator 47, a developing blade 49 and other well-known parts. The agitator 47 agitates toner contained in a toner container 21b and supplies the toner to the developing roller 45. The developing blade 49 frictionally charges the toner adhered to the surface of the developing roller 45.

Figure 3:
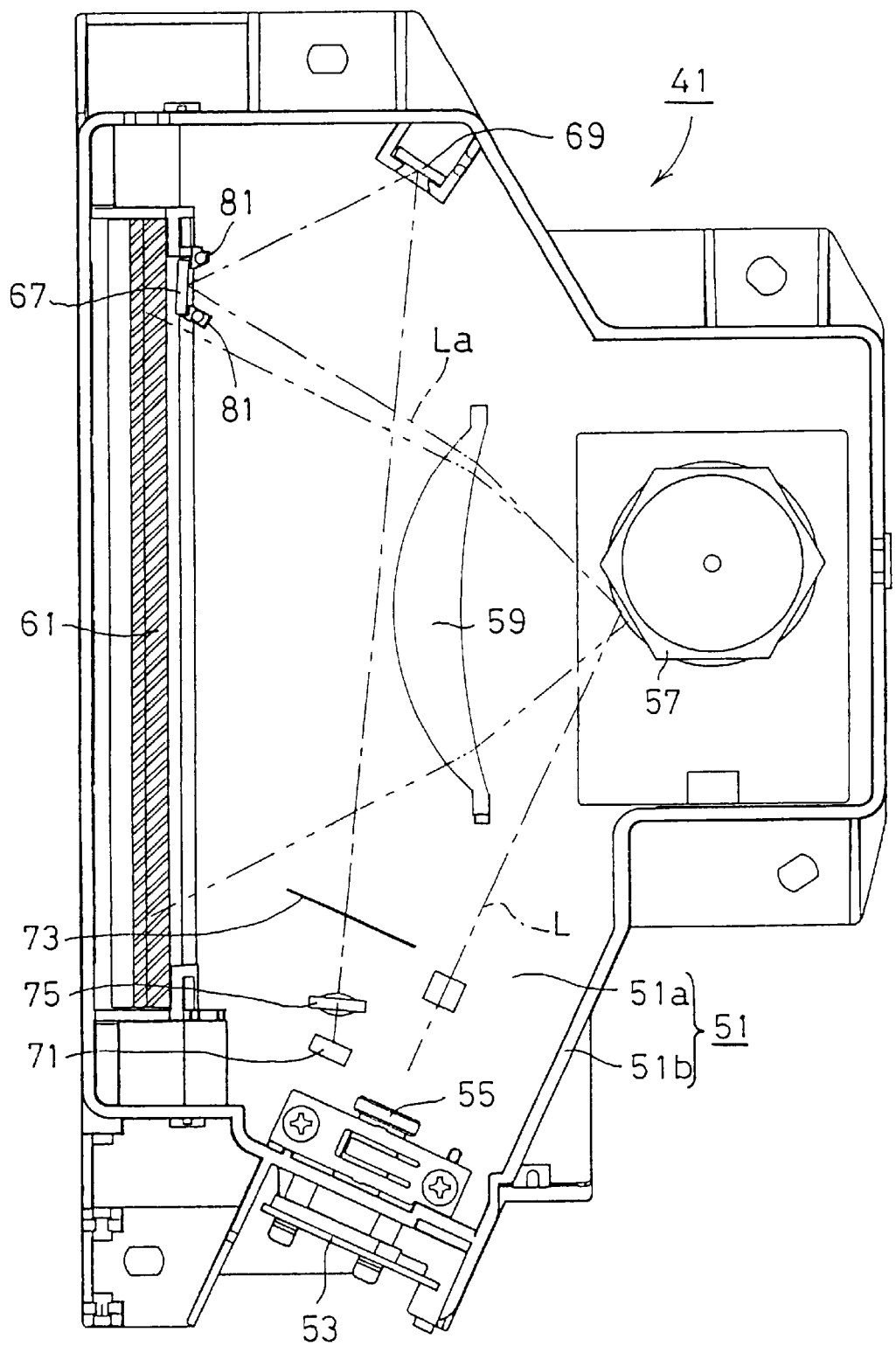
FIG. 3 is a plan view of a scanner unit of the laser-beam printer.
Figure 4:
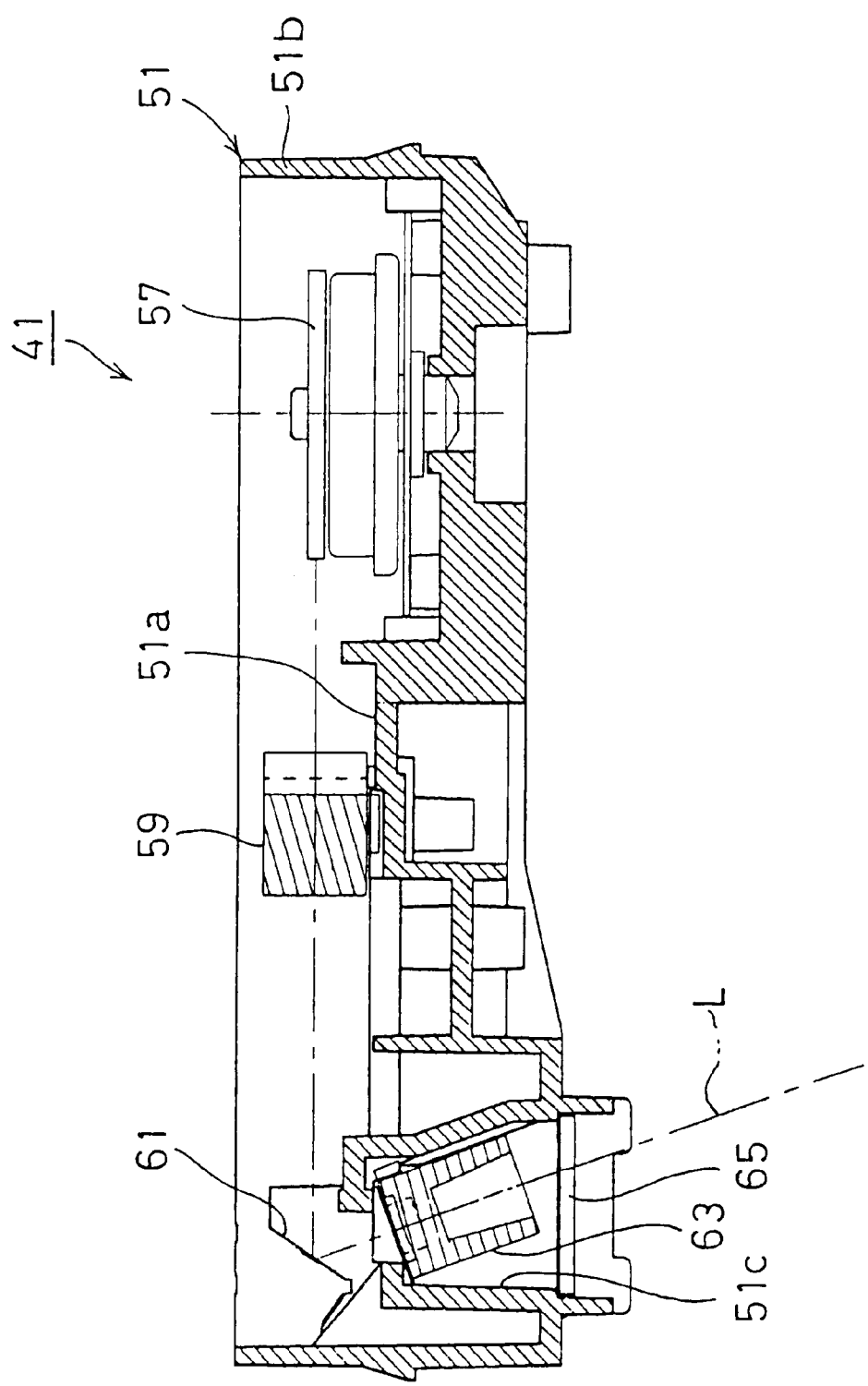
FIG. 4 is a vertical sectional view of the scanner unit.

The structure of the scanner unit 41 will be described below. As shown in FIGS. 3 and 4, the scanner unit 41 has a housing 51 with its upper surface open, which includes a substantially flat bottom plate 51a and a side wall 51b extending from a periphery of the bottom plate 51a. On the surface of the bottom plate 51a, a collimator lens 55, a polygon mirror 57, an f-theta lens 59 and a reflecting mirror 61 are fixed to provide an optical path of laser light L emitted from a laser emitting unit 53.

With this structure, the laser light L emitted from the laser emitting unit 53 is deflected toward a predetermined scanning direction by the polygon mirror 57, and then is reflected off the reflecting mirror 61. As a result, the laser light L can be emitted from a light emitting hole 51c (see FIG. 4) formed in the bottom of the housing 51. As shown in FIG. 4, a cylindrical lens 63 and a cover glass 65 are provided in the light emitting hole 51c. The laser light L reflected by the reflecting mirror 61 passes through the cylindrical lens 63. The cover glass 65 covers the light emitting hole 51c from the bottom.

As shown in FIG. 3, a first beam detection mirror 67 is disposed adjacent to the reflecting mirror 61. Working together with a second beam detection mirror 69 disposed at a position deviated from the optical path of the deflected laser light L toward the photoconductive drum 23, the first beam detection mirror 67 reflects the laser light La indicating an initial position of scanning, toward a beam detection sensor 71. Provided in front of the beam detection sensor 71 are a slit plate 73 and a beam detection lens 75. The beam detection sensor 71, the slit plate 73, and the beam detection lens 75 are also disposed at positions deviated from the optical path of the reflected laser light L toward the photoconductive drum 23. With this structure, the timing at which the laser light L from the laser emitting unit 53 is turned on and off is set in accordance with the timing at which the beam detection sensor 71 detects the laser light La. By doing so, an irradiating direction of the laser light L can be precisely defined.

It is necessary that the first beam detection mirror 67 be miniaturized as much as possible in order to secure a reflective surface of the reflecting mirror 61. In the scanner unit 41 of this embodiment, the first beam detection mirror 67 is fixed to the housing 51 using supporting pins 81 and a supporting plate 83.

Figure 5A:
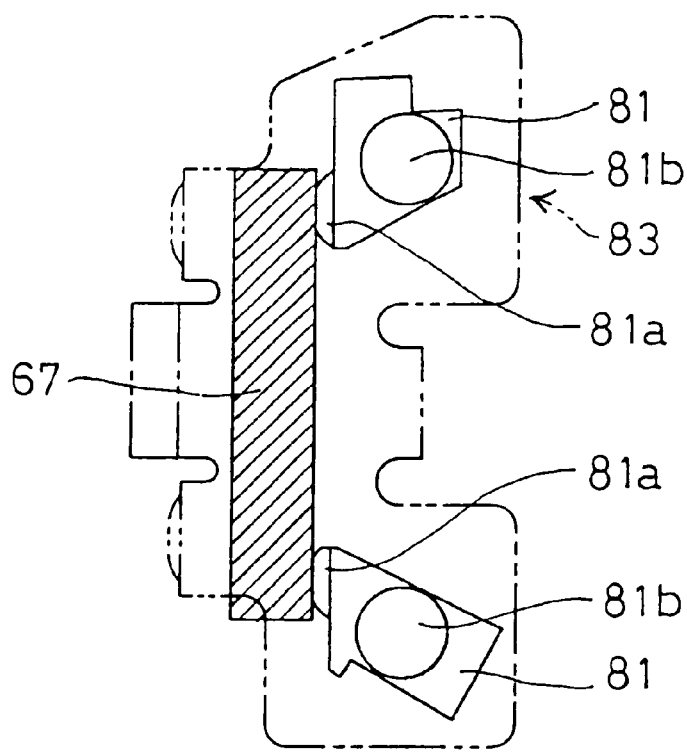
FIG. 5A is a plan view of a first beam detection mirror, supporting pins and a supporting plate in the scanner unit.
Figure 5B:
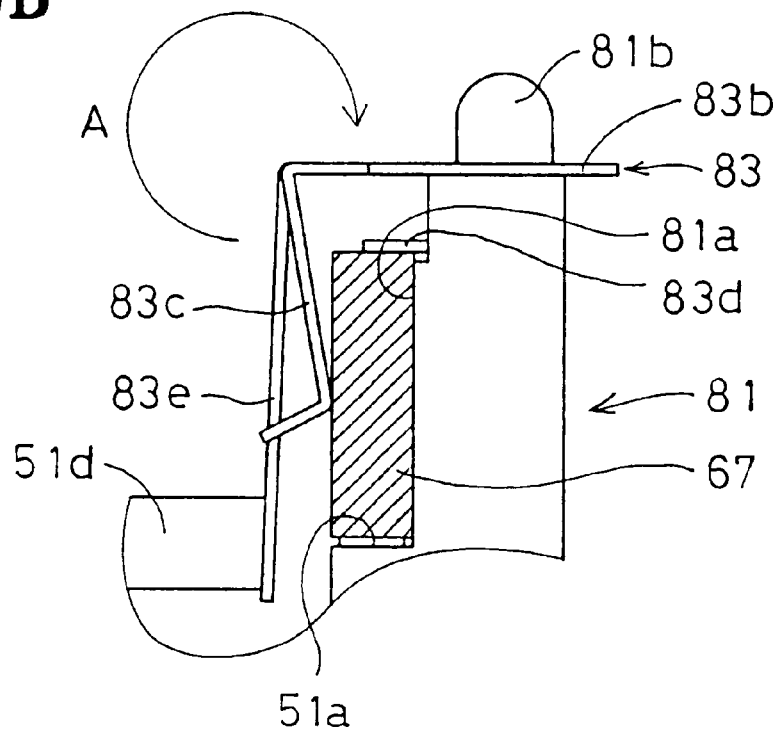
FIG. 5B is a side view of the first beam detection mirror, the supporting pins and the supporting plate in the scanner unit.

As shown in FIGS. 5A and 5B, a pair of supporting pins 81 stand on the bottom plate 51a of the housing 51. Each of the supporting pins 81 includes an abutment portion 81a and a protrusion 81b. The abutment portions 81a of the supporting pins abut and support both edges of the first beam detection mirror 67, so that the reflective surface of the first beam detection mirror 67 is placed in a predetermined position. The protrusions 81b are engaged in respective engagement holes 83a (see FIG. 6B) formed in the supporting plate 83.

Figure 6A:
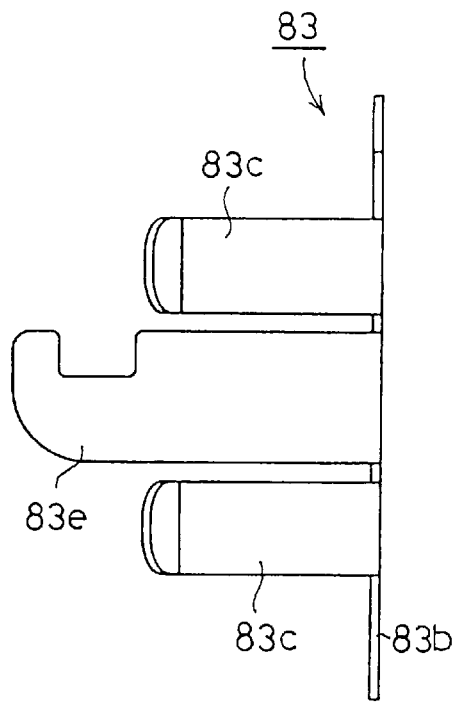
FIG. 6A is a front view of the supporting plate.
Figure 6B:
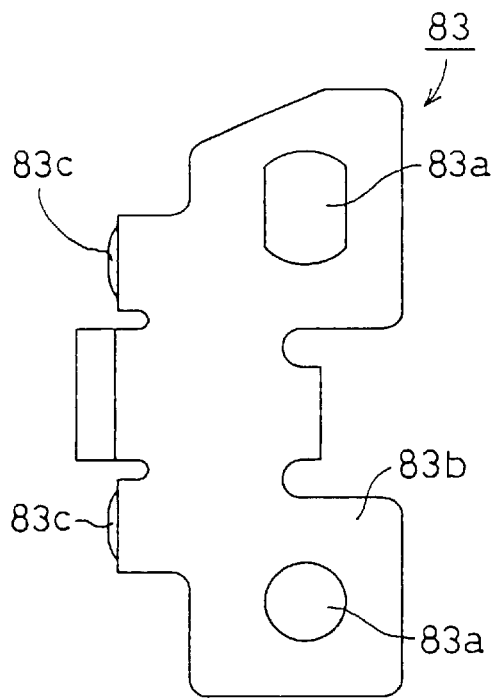
FIG. 6B is a plan view of the supporting plate.
Figure 6C:
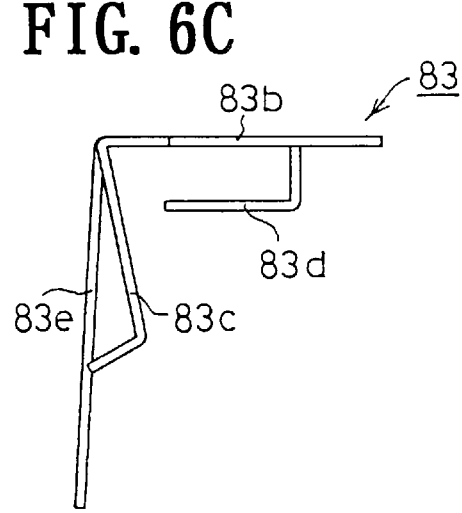
FIG. 6C is a side view of the supporting plate.

As shown in FIGS. 6A, 6B and 6C, the supporting plate 83 includes a first engagement portion 83b, which is engaged with the upper portion of the supporting pins 81 by which the protrusions 81b are engaged in the respective engagement holes 83a. A pair of first spring portions 83c are formed by which free ends of shorter elongated portions, extending from one end of the first engagement portion 83b, are slightly bent upward, and then the elongated portions are further bent toward the other end of the first engagement portion 83b. The first spring portions 83c urge the back of the first beam detection mirror 67 toward the abutment portions 81a from the position opposed to the abutment portions 81a of the supporting pins 81.

A second spring portion 83d is formed by which an elongated portion, bent downward from the first engagement portion 83b has its free end further bent so as to be parallel to the first engagement portion 83b and extending from a substantially middle part of the first engagement portion 83b. The second spring portion 83d urges the upper surface of the first beam detection mirror 67, thereby fixing the first beam detection mirror 67 between the second spring portion 83d and the bottom plate 51a.

A second engagement portion 83e is formed by which a longer elongated portion, extending from the one end of the first engagement portion 83b, is bent downward between the first spring portions 83c. At a free end side, the second engagement portion 83e engages a flange 51d (see FIG. 5B) of the housing 51, thereby preventing the supporting plate 83 from rotating in a direction, indicated with an arrow A in FIG. 5B, to come off an upper edge of the first beam detection mirror 67 due to the primarily downward urging force from the second spring portion 83d.

One of the engagement holes 83a has a circular shape and the other has an oval shape so that the protrusions 81b can be easily engaged with the respective engagement holes 83a.

The supporting pins 81 stand inside of the housing 51 and extend from the bottom plate 51a. The supporting pins 81 abut one surface of the first beam detection mirror 67 to position the first beam detection mirror 67.

The supporting plate 83 urges the first beam detection mirror 67 toward the supporting pins 81 while the first engagement portion 83b engages the supporting pins 81. That is, the urging force from the supporting plate 83 applies to both sides of the supporting pins 81, so that the force is not exerted on the supporting pins 81 from only one direction. Therefore, a mounting angle of the first beam detection mirror 67 is not changed by the action of the supporting pins 81, and the positioning of the first beam detection mirror 67 can be precisely performed with stability. Further, the supporting pins 81 do not require an extremely high strength. Accordingly, the supporting pins 81 can be reduced in size, so that the reflective surface of the reflecting mirror 61 and the first beam detection mirror 67 can be excellently secured. Further, the scanner unit 41 can be reduced in size. This results in miniaturizing the laser-beam printer 1.

The reflective surface of the first beam detection mirror 67 is directly supported by the supporting pins 81, so that the reflecting direction of the laser light can be further precisely defined.

As described above, the supporting pins 81 can be reduced in size. Accordingly, the reflective surface of the first beam detection mirror 67 can be excellently secured.

With the reduction of the size of the supporting pins 81, it becomes possible to further precisely set the timing of on/off of the laser emitting unit 53, by disposing the first beam detection mirror 67 in the immediate vicinity of the optical path of the laser light L toward the photoconductive drum 23.

The supporting plate 83 is supported against the urging force from the second spring portion 83d by engaging the second engagement portion 83e with the flange 51d, while the second spring portion 83d holds the first beam detection mirror 67 between the bottom plate 51a and the second spring portion 83d of the supporting plate 83. Accordingly, a load on the first engagement portion 83b and the supporting pins 81 due to the urging force from the second spring portion 83d is prevented. Consequently, the load imposed on the supporting pins 81 can be further reduced.

The first spring portion 83c is provided for each supporting pin 81, so that the urging force from the first spring portions 83c act equally on the supporting pins 81.

The first beam detection mirror 67 is supported by forces from four directions, that is, the forces from the abutment portions 81a of the supporting pins 81, from the bottom plate 51a of the housing 51, and from the first spring portions 83c and the second spring portion 83d of the supporting plate 83. Accordingly, the beam detection mirror 67 can be stably fixed in a proper position. Consequently, in the laser-beam printer 1 of this embodiment, irradiation accuracy of the laser light L from the scanner unit 41 is greatly improved. This results in greatly improving the image forming accuracy of the laser-beam printer 1.

Because the timing of on/off of the laser emitting unit 53 can be precisely set as described above, the irradiating direction, the irradiation accuracy and the image forming accuracy of the laser light L is improved. The supporting plate 83 is formed by pressing a single metal plate, so that the production cost for the supporting plate 83 is reduced.

Figure 8:
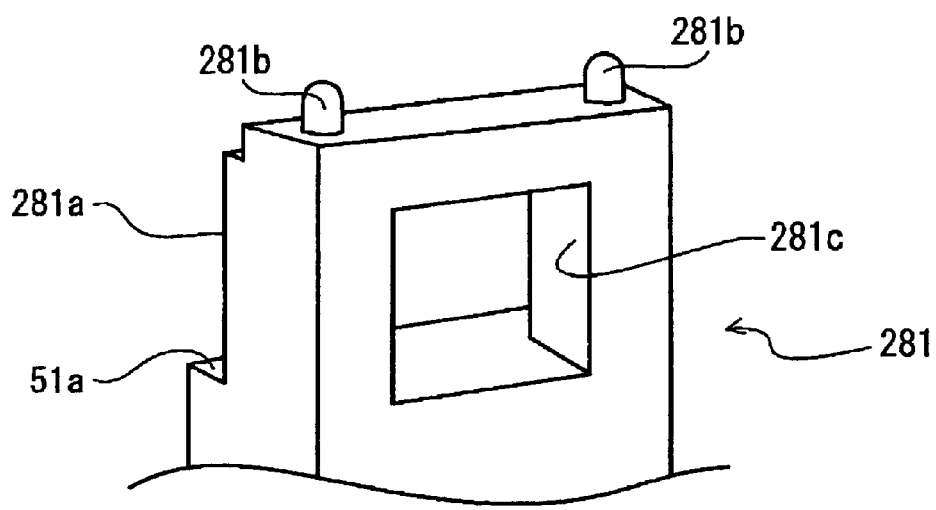
FIG. 8 is a perspective view of a supporting member.

In this embodiment, a pair of supporting pins 81 is provided as a supporting member of the optical element. A supporting member can be a projection or rib in a block shape extended from the bottom plate 51a. Referring to FIG. 8, the block shape projection 281 includes an abutment portion 281a and protrusions 281b. The abutment portion 281a abuts and supports the first beam detection mirror 67, so that the reflective surface of the first beam detection mirror 67 is placed in a predetermined position. The protrusions 281b are engaged in respective engagement holes 83a of the supporting plate 83. The block shape projection 281 has a window 281c in the middle to pass the laser light L to and from the first beam detection mirror 67 mounted between the supporting plate 83 and the block shape projection 281.

Figure 7:
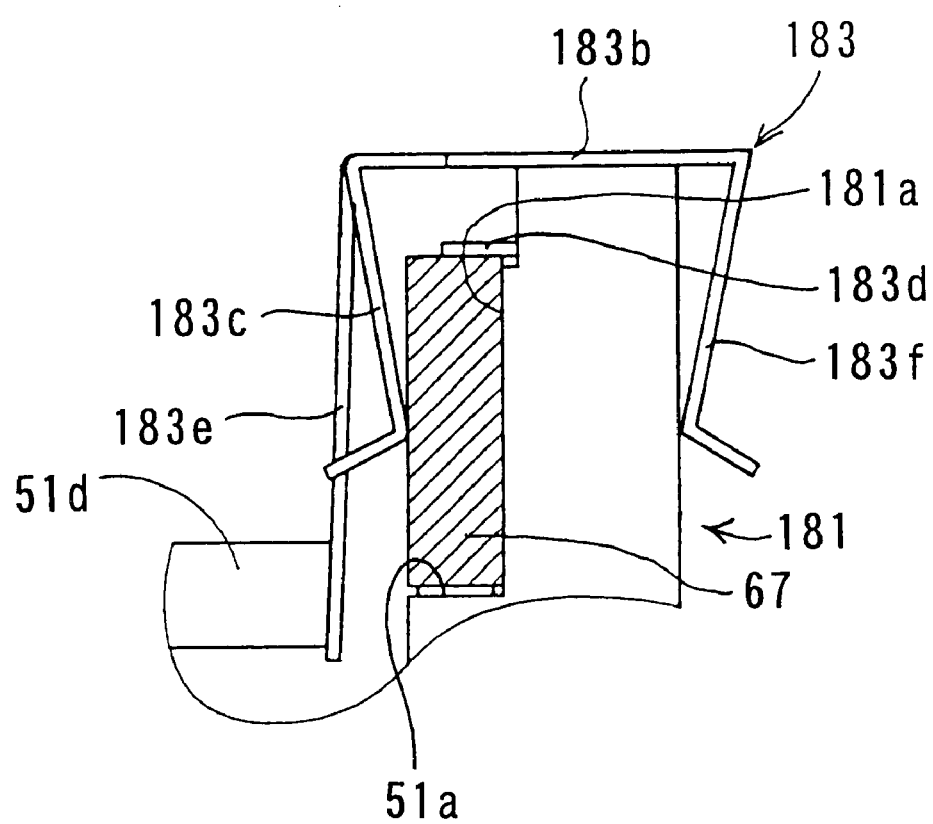
FIG. 7 is a side view of a supporting plate of a second embodiment of the invention.

A second embodiment of the invention will be described below. A supporting plate 183 of the second embodiment is shown in FIG. 7. In the supporting plate 183, first spring portions 183c are formed by downwardly bending elongated portions extending from one end of a first engagement portion 183b. Third spring portions 183f are formed by which portions extending from other end of the first engagement portions 183b are bent downward and then are further bent toward the one end of the first engagement portion 183b. With this structure, the supporting plate 183 holds itself by urging force from the first spring portions 183c and the third spring portions 183f.

The supporting plate 183 is supported against the urging force from a second spring portion 183d by engaging a second engagement portion 183e with the flange 51e, while the second spring portion 183d holds the first beam detection mirror 67 between the bottom plate 51a and the second spring portion 183d in the supporting plate 183.

The first beam detection mirror 67 is supported by forces from four directions, that is, the forces from abutment portions 181a of the supporting pins 181, from the bottom plate 51a, and from the first spring portions 183c and from the second spring portion 183d of the supporting plate.

Figure 9:
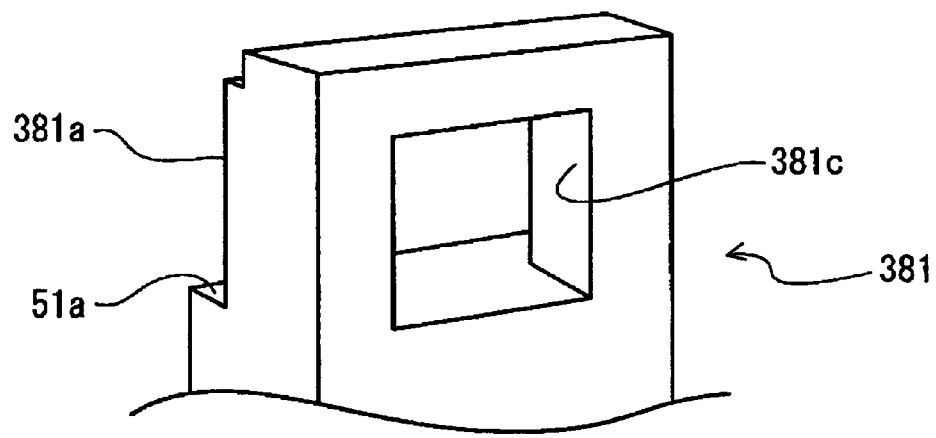
FIG. 9 is a perspective view of an alternative supporting member.

A pair of supporting pins 181 as a supporting member of the optical element can be a projection or rib in a block shape extended from the bottom plate 51a. Referring to FIG. 9, a block shape projection 381 includes an abutment portion 381a. The abutment portion 381a abuts and supports the first beam detection mirror 67, so that the reflective surface of the first beam detection mirror 67, so that the reflective surface of the first beam detection mirror 67 is placed in a predetermined position. The supporting plate 83 engages the block shape projection 381 by urging force from the first spring portions 183c and the third spring portions 183f. The block shape projection 381 has a window 381c in the middle to pass the laser light L to and from the first beam detection mirror 67 mounted between the supporting plate 83 and the block shape projection 381.

The invention can be also applied to the scanner unit to fix other optical elements, such as lenses and slits.

While the invention has been described in detail with reference to specific embodiments thereof, it would be apparent to those skilled in the art that various changes and modifications may be made therein without departing from the spirit of the invention.

What is claimed is:

1. A scanner unit, comprising:
    a housing;
    a light source;
    a reflecting member;
    an optical element; and
    a supporting plate that supports the optical element, wherein the supporting plate includes:
        an engagement portion to be attached to a supporting member projected from a housing of the scanner unit; and
        at least one spring portion bent from the engagement portion toward the supporting member, the at least one spring portion exerting an urging force toward the supporting member on an optical element disposed between the supporting member and the spring portion.

2. The scanner unit according to claim 1, wherein the supporting member is a pair of pins and each of the pins has one end face that abuts the optical element, wherein the one end faces of the pins position the optical element.

3. The scanner unit according to claim 2, wherein each of the pins has a protrusion, and the engagement portion has holes into which the protrusions are engaged.

4. The scanner unit according to claim 3, wherein one of the holes is an elongated hole.

5. The scanner unit according to claim 3, wherein the at least one spring portions comprises a pair of first spring portions, each first spring portion urging, a corresponding end face of the optical element toward the supporting plate, which equal the pins in number.

6. The scanner unit according to claim 5, wherein the housing has a bottom portion which supports one end of the optical element, the supporting plate further comprising a second spring portion that urges the optical element disposed between the bottom portion and the supporting plate, toward the bottom portion.

7. The scanner unit according to claim 6, further comprising a second engagement portion that is to be engaged with the housing to fix the supporting plate to another portion of the housing against the urging force from the second spring portion.

8. The scanner unit according to claim 7, wherein the supporting plate is formed of a single metal plate.

9. The scanner unit according to claim 1, wherein the optical element is a mirror, and the one end face is a reflective surface of the mirror.

10. The scanner unit according to claim 2, wherein the at least one spring portion includes a first spring portion that is bent toward each pin of the pair of pins, wherein the first spring portion exerts an urging force on the pins from a direction opposite to the one end face.

11. The scanner unit according to claim 10, wherein the at least one spring portion includes a second spring portion that urges the optical element against the one end face of the pins, and the second spring portion includes portions equal in number and opposed to the pins.

12. The scanner unit according to claim 11, wherein the housing has a bottom portion which supports one end of the optical element, the supporting plate further comprising a second spring portion that urges the optical element disposed between the bottom portion and the supporting plate, toward the bottom portion.

13. The scanner unit according to claim 12, further comprising a second engagement portion that is to be engaged with the housing to fix the supporting plate to another portion of the housing against the urging force from the second spring portion.

14. The scanner unit according to claim 13, wherein the supporting plate is formed of a single metal plate.

15. A support mechanism for supporting an optical element in a device having a base and a supporting member extending from the base, the supporting member having a free end and an abutment face, the support mechanism comprising a support having:
   a base portion attached to the supporting member;
   a pair of springs extending from a side of the base portion to as to oppose the supporting member with the optical element therebetween; and
   a second spring extending from the base portion to engage a top of the element and press the optical element against the base.

16. The support mechanism according to claim 15, further comprising an engagement portion extending from the base portion between each spring of the pair of springs and engaging the base.

17. The support mechanism according to claim 15, wherein the base portion has a pair of openings, each opening receiving the free end of the supporting member.

18. The support mechanism according to claim 17, wherein one opening is elongated as compared to the other opening.

19. An image forming apparatus, comprising:
   a scanner unit that scans and irradiates light;
   a photoconductive drum that is exposed by the light irradiated by the scanner unit;
   a developing device that develops an image exposed on the photoconductive drum into a visualized toner image using a developing agent;
   a fixing device that transfers the toner image onto a printing medium and fixes the toner image on the printing medium;
   wherein the scanner unit includes:
     an optical element; and
     a mount for the optical element having:
       a base;
       a support member extending from the base; and
       a supporting plate having:
         an engagement portion mounted to the support member;
         a pair of springs extending from the engagement portion, the pair of springs opposing the support member with the optical element held therebetween; and
         another spring extending from the engagement portion to engage an edge of the optical element and press the optical element against the base.

20. The image forming apparatus according to claim 19, further comprising a second engagement portion extending from the supporting plate and substantially between the springs of the pair of springs to engage the base.

* * * * *